United States Patent [19]

Friedrichs

[11] 4,282,979
[45] Aug. 11, 1981

[54] FORCE ABSORBING ARRANGEMENT

[75] Inventor: Josef Friedrichs, Krefeld-Verberg, Fed. Rep. of Germany

[73] Assignee: Ringfeder G.m.b.H., Krefeld, Fed. Rep. of Germany

[21] Appl. No.: 44,549

[22] Filed: Jun. 1, 1979

[30] Foreign Application Priority Data

May 4, 1979 [DE] Fed. Rep. of Germany ....... 2918092

[51] Int. Cl.³ .................. F16F 1/06; B61G 11/06; B61G 11/14
[52] U.S. Cl. ....................... 213/29; 213/29; 213/32 R; 267/138; 267/168; 267/169; 267/177
[58] Field of Search ............ 267/138, 139, 168, 169, 267/177, 9 R, 9 A, 9 B; 213/29, 30, 32 R, 32 A; 293/137

[56] References Cited

U.S. PATENT DOCUMENTS

| 1,882,801 | 10/1932 | Geiger | 267/9 A |
| 1,894,385 | 1/1933 | Webb | 267/9 A X |
| 2,053,990 | 9/1936 | Goodwin | 267/9 A X |
| 2,471,061 | 5/1949 | Dath | 267/9 A X |
| 3,164,263 | 1/1965 | Novikov et al. | 213/29 |
| 3,227,288 | 1/1966 | Mulcahy et al. | |
| 4,143,898 | 3/1979 | Klaus et al. | 293/137 |

FOREIGN PATENT DOCUMENTS

| 493911 | 2/1950 | Belgium | 267/9 B |
| 878452 | 6/1953 | Fed. Rep. of Germany | 267/9 B |
| 1455238 | 12/1971 | Fed. Rep. of Germany | |
| 2707358 | 8/1978 | Fed. Rep. of Germany | |
| 2741739 | 3/1979 | Fed. Rep. of Germany | 267/9 A |

Primary Examiner—George E. A. Halvosa
Attorney, Agent, or Firm—Michael J. Striker

[57] ABSTRACT

An arrangement for resilient absorption of forces, particularly for an intermediate buffer coupling of rail vehicles, comprises an elongated housing having open and closed ends, a friction element located in the region of the open end of the housing, a resilient element cooperating in series with the friction element and formed as a friction spring including a plurality of inner conical rings and a plurality of outer conical rings cooperating with one another with interposition of lubricant, outer and inner cup-shaped casing members located in the housing and closeably accommodating the friction spring. The outer cup-shaped member forms a support for one end of the friction spring, whereas the inner cup-shaped member forms a support for the other end of the friction spring. A sealing element is fitted on the outer cup-shaped member and held on the inner cup-shaped member so that the outer and inner cup-shaped members can move relative to one another in a direction of elongation of the housing, but at the same time are sealed by the sealing element.

23 Claims, 6 Drawing Figures

FORCE ABSORBING ARRANGEMENT

BACKGROUND OF THE INVENTION

The present invention relates to an arrangement for resilient absorption of forces, particularly for intermediate buffer couplings for rail vehicles. Arrangements of the above-mentioned general type are known in the art. A known arrangement has a housing which is closed at its one end, and a resilient support or element accommodated in the housing. The resilient support cooperates in series with a friction device located in the region of an open end of the housing.

Spring arrangements provided in conventional draw and buffer arrangements must be constructed so as to perform the stroke in correspondence with especially high energy absorption which is required in connection with the increasing weight of the vehicles and careful treatment of the transported loads.

One of the known arrangements is disclosed in the U.S. Pat. No. 3,227,288. The friction device of this arrangement comprises a substantially central wedge-formed member with surrounding friction shoes, and a housing is provided at its open end with projections which reduce the cross-section of the opening of the housing. Projections provided on the wedge-formed member cooperate with the above-mentioned projections of the housing so as to limit the outward displacement of the wedge-formed member. When percussive force acts upon the arrangement, the central wedge-formed member is displaced into the interior of the housing. This force is split into two components on inclined surfaces of the wedge-formed member and inclined surfaces of the friction shoes. One of the force components presses the friction shoes inwardly into the housing, whereas the other force component presses the friction shoes toward firm frictional engagement with the inclined friction surfaces in the region of the open end of the housing. The cylindrical resilient element counteracts the inward displacement of the friction shoes, with interposition of a plate. The resilient element has a stiffness which is codetermined for the energy absorption of the friction device. The resilient element in the known constructions is composed of interconnected disc springs of rubber or a similar elastomeric material which allows to support the friction device and to return it to its starting position only to a limited extent. At the same time it is known from experience that such springs have a service life which is smaller than that of the vehicle.

SUMMARY OF THE INVENTION

Accordingly, it is an object of the present invention to provide an arrangement for resilient absorption of forces, which avoids the disadvantages of the prior art.

More particularly, it is an object of the present invention to provide an arrangement which possesses high energy absorption properties, whose friction device more reliably returns to its initial position and whose resilient element has a greater service life as compared with known arrangements.

In keeping with these objects and with others which will become apparent hereinafter, one feature of the present invention resides, briefly stated, in an arrangement in which outer and inner cup-shaped casing members are provided located in a housing and closeably accommodating a resilient element which is formed as a friction spring having a plurality of cooperating inner and outer rings, of which the outer cup-shaped member outwardly surrounds the outer conical rings of the friction spring and is located in the region of one end of the latter so as to form a support for the one end of the friction spring, and the inner cup-shaped member is located inwardly of the inner rings of the friction spring and in the region of the other end of the latter so as to form a support for the other end of the friction spring, and a sealing element is provided which is constituted, for instance, of a synthetic plastic material, and is fitted on the outer cup-shaped member and held on the inner cup-shaped member, so that the cup-shaped members can move relative to one another in direction of elongation of the housing, but at the same time are sealed relative to one another by the sealing element. The outer cup-shaped member may have a bottom which forms the support for the one end of the friction spring, whereas the inner cup-shaped member may have radially outwardly extending flanges which forms the support for the other end of the friction spring.

The thus constructed arrangement possesses high energy absorption properties. At the same time its friction device more reliably returns to its initial posisition and its resilient element has a greater service life as compared with those of the known arrangements.

In accordance with another feature of the present invention, the sealing element is formed as a bellows and is connected by mounting means, such as a clamping band, to the wall of the outer cup-shaped member.

Sealing connection between the sealing element and the outer cup-shaped member without additional mounting means, which also helps to stabilize both cup-shaped members, may be performed, in accordance with still another feature of the present invention, so that the sealing element is formed as a tubular member of an elastic material, for instance, a synthetic plastic material, and is fitted on the wall of the outer cup-shaped member with a force which is directed inwardly of this wall. The connection of the sealing element with the inner cup-shaped member can be performed by similar parts, such as a clamping band or a hose clip. In order to exclude such connecting parts for holding of the sealing element on the inner cup-shaped member, the inner cup-shaped member, in accordance with a further feature of the present invention, may be provided with a flange which abuts against a base plate of the housing, and the sealing element, such as a bellows or a tube, may be provided with a collar which is clamped between the base plate of the housing and the flange of the inner cup-shaped member. The collar of the sealing element can be additionally connected with the flange on the inner cup-shaped member by glue.

In accordance with still a further embodiment of the present invention, the sealing element is held on the inner cup-shaped member without additional connecting means, and further this member is centered relative to the housing and the friction spring is guided. This is attained by that the inner cup-shaped member with its flange abuts against an additional plate arranged on the base plate of the housing, which plate has an outer surface cooperating with the sealing element and has a collar for centrally receiving the inner cup-shaped member. The additional plate has an inner hole and is guided on a pin provided on the base plate of the housing.

In order to provide simple clamping of the friction spring, a cup-shaped pulling member is interposed between the bottom of the outer cup-shaped member and the end of the friction spring. The pulling member is connected with the inner cup-shaped member by a central pulling screw so that the friction spring is prestressed.

In accordance with yet a further feature of the present invention, in order to provide for a fast and a dimensionally correct assembling of the cup-shaped pulling member with the outer cup-shaped member, the cup-shaped pulling member abuts against a collar provided on the bottom of the outer cup-shaped member so as to be centered thereon.

In accordance with an additional feature of the present invention, the outer cup-shaped member in the region of its bottom is provided with a coating of a wear-resistant material, such as hart manganese, and a friction shoe of the friction device has an inner face abutting against the coating. The coating forms a reinforcement of the bottom of the outer cup-shaped member and cooperates under the action of percussive force acting upon the arrangement with the friction shoe which is constituted of a very hard material, in wear-free manner. The thus-obtained reinforcement and practically eliminated wear result in an especially high service life of the resilient element and its outer cup-shaped member. Moreover, the coating may have differing thicknesses which makes possible adjustment of the housing which is generally manufactured by casting with large dimensional tolerances, relative to the length of the inner space which is required for the resilient element.

Form-locking connection between the coating and the outer cup-shaped member, or in other words, direct contact between the same, may be attained so that movement of the coating during the sliding movement of the friction shoe is prevented. This can be performed by that the coating is cup-shaped and guided on a circumferential wall of the bottom of the outer cup-shaped member.

The thus-constructed cup-shaped coating may be provided with a slot extending in the direction of the stroke of the arrangement. The location and width of the slot corresponds to those of projections which are provided in the regions of the openings of the housing and reduce the cross-section of the opening. The outer cup-shaped member which carries the cup-shaped coating can have an outer diameter which corresponds to these projections. Thereby, the friction spring may have an especially large outer diameter which is required for its predetermined energy absorption characteristics.

In order to provide a guidance for the outer cup-shaped member and thereby for the friction spring, the bottom of the outer cup-shaped member or the coating may have a guiding pin extending toward the open end of the housing and engaged in an opening provided in the central wedge-formed member of the friction device.

The opening may have a cross-section which has in a central region a diameter corresponding to the diameter of the guiding pin, and conically diverges from the central section to both ends of the opening. In such a construction, the guidance of the upper cup-shaped member is performed even in the case of possible canting of the wedge-formed member without wedging of the guiding pin in the opening.

The advantages of the arrangement in accordance with the present invention are that the spring arrangement has high energy absorption properties in the sense of an increased damping of the forces which act upon the arrangement. This is attained by the friction spring which forms an effective support for the friction device. Thereby a firm frictional engagement of the friction shoes with the friction surfaces in the housing is provided, and the remaining axial force component which displaces the friction shoes inwardly is taken up by the friction spring. In connection with this, a reliable return of the friction device to its initial position after withdrawal of the percussive force is guaranteed. A further advantage of the inventive arrangement is that the service life of the arrangement is increased, to which the cup-shaped members protecting the friction spring from dust and moisture and the sealing element contribute. These parts also prevent an action of the lubricant of the friction spring onto the friction surfaces of the friction device.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
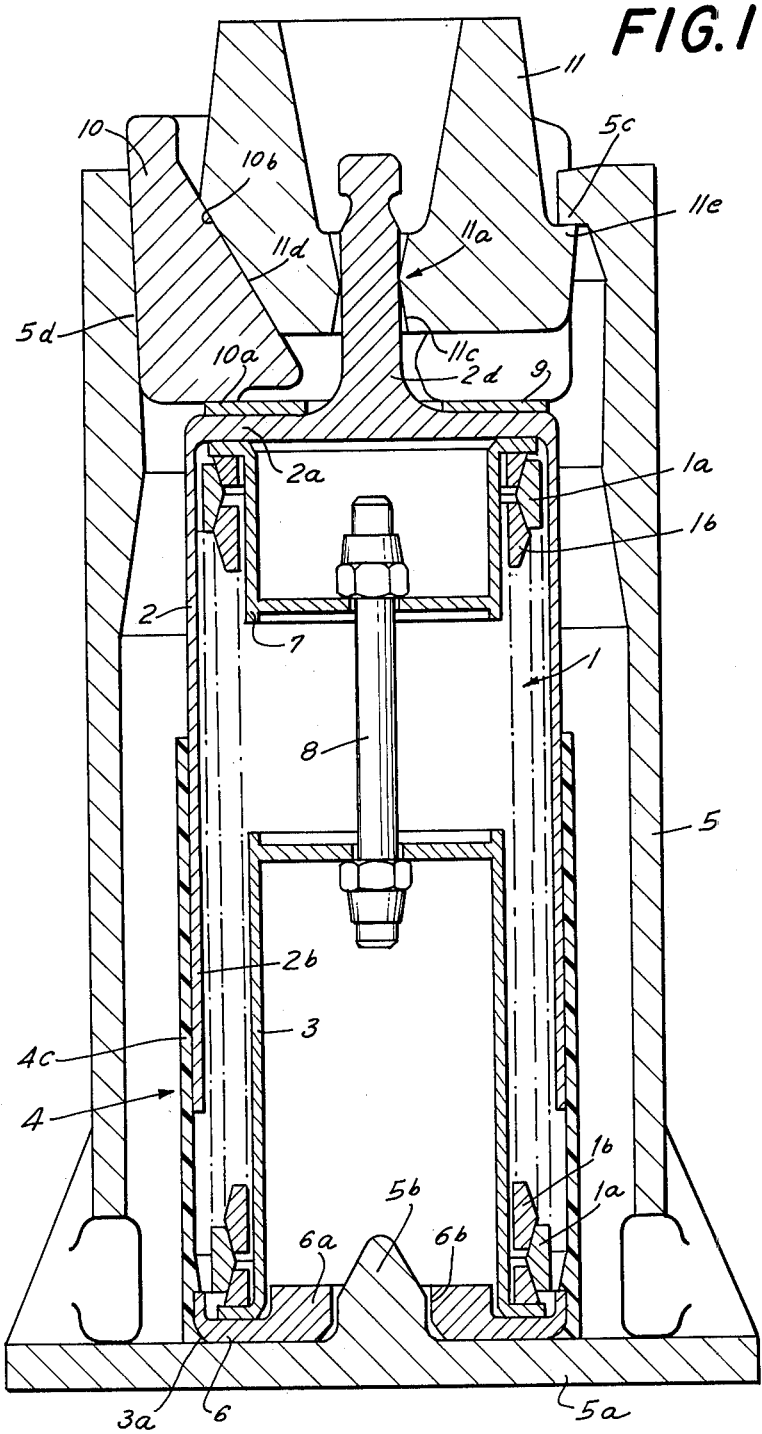
FIG. 1 is a view showing the longitudinal section of a spring arrangement in accordance with the present invention in unloaded condition.
Figure 3:
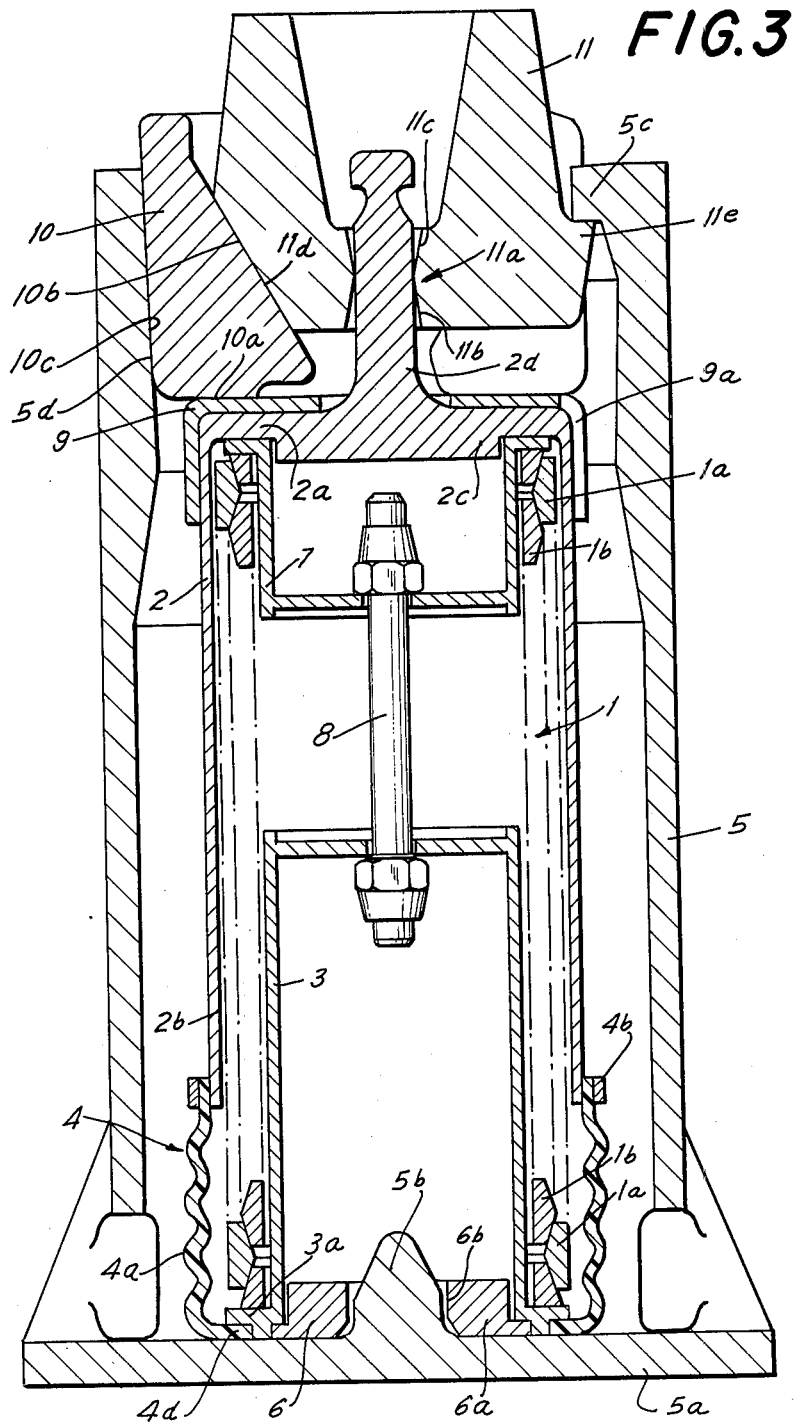
FIG. 3 is a view showing a longitudinal section of a spring arrangement in accordance with a further embodiment of the invention.

A spring arrangement shown in FIGS. 1 and 3 has a housing 5 with a rectangular base plate 5a which is connected with the housing 5 and has resistance to bending. The housing 5 has an open end wherein a friction device is located. The friction device includes a central wedge-formed member 11 and three friction shoes 10 which are offset relative to one another in a circumferential direction by an angle of 120°. The wedge-formed member 11 and the friction shoes 10 cooperate with one another through wedge surfaces 11d and 10b, respectively. The friction shoes 10 abut by their outer friction surfaces 10c against an inner friction surface 5d of the housing 5. In order to limit movement of the friction device toward the open end of the housing 5, the central wedge-formed member 11 has outer projections 11e which are offset relative to one another in a circumferential direction by 120° and engage with respectively arranged inwardly extending projections 5c of the housing 5.

As can be seen further from FIGS. 1 and 3, the friction device is supported on a friction spring 1 which is arranged between the friction shoes 10 and the base plate 5a of the housing 5. The friction spring 1 is composed of double conical outer rings 1a and double conical inner rings 1b. They are guided over one another through their conical surfaces with interposition of a suitable lubricant such as grease. Means is provided for protecting the friction spring 1 from dirt and moisture which can penetrate into the housing 5, and for preventing an action of the lubricant upon the friction surfaces 5d of the housing 5, which can otherwise reduce the energy absorption characteristics of the friction spring 1 or the friction device. This means is formed by an outer cup-shaped casing member 2 and an inner cup-shaped casing member 3 as well as by a sealing element 4.

The outer cup-shaped member 2 surrounds a part of the outer rings 1a and has a bottom 2a which forms a support for one end of the friction spring 1. The inner cup-shaped member 3 is located inwardly of the inner rings 1b and has a flange 3a with which the other end of the friction spring 1 cooperates. A pulling member 7 having a cup-shaped cross-section is located between the bottom 2a of the outer cup-shaped member 2 and the one end of the friction spring 1. The pulling member 7 is connected with the inner cup-shaped member 3 by a centrally extending pulling screw 8, so that the friction spring 1 is prestressed. FIG. 3 shows that the pulling member 7 can abut against a collar 2c provided on the bottom 2a of the outer cup-shaped member 2 so as to be centered on this collar.

Figure 6:
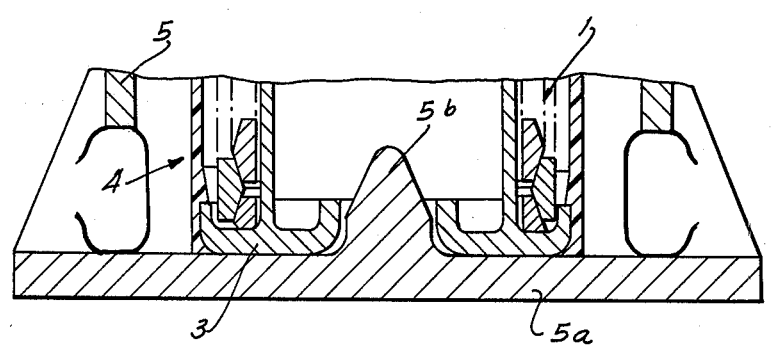
FIG. 6 is a longitudinal section of a fragment of the arrangement shown in FIG. 1, in accordance with still a further embodiment of the invention.

As can be seen from the FIG. 1 the sealing element which is identified in toto by reference numeral 4 is formed as a tube 4c constituted of a synthetic plastic material. The tube 4c is fitted on a wall 2b of the outer cup-shaped member 2 with a radially inwardly directed force. In not assembled condition the tube 4c has an inner diameter which is smaller than the outer diameter of the outer cup-shaped member 2 in the region of its wall 2b. Thereby when the tube 4c is forcedly fitted onto the wall 2b, the above-mentioned force is developed and the tube 4c is elastically extended. The other, free end of the tube 4c is similarly connected with a plate 6 with radial pre-stress, and moreover, is clamped between the plate 6 and the base plate 5a of the housing 5. The plate 6 has a collar 6a on which the inner cup-shaped member 3 is fitted and centered. On the other hand, the plate 6 has an opening 6b through which a pin 5b provided on the base plate 5a extends so that the plate 6 is guided on the pin 5b. In accordance with a modification shown in FIG. 6, the plate 6 and the inner cup-shaped member 3 may be of one piece with one another, so as to form an integral member which can be produced, for example, by casting.

In the spring arrangement shown in FIG. 3, a bellows 4a is utilized as the sealing element 4. The bellows 4a are connected by connecting means 4b, such as a clamping band, with the wall 2b of the outer cup-shaped member 2. The other end of the bellows 4a has an inwardly directed collar 4d which is located between a flange 3a of the inner cup-shaped member 3 and the base plate 5a of the housing 5. A guidance for the inner cup-shaped member 3 is here also performed by the plate 6 having an opening 6b through which the pin 5b extends, and a collar 6a. The plate 6 may also be of one piece with the inner cup-shaped member 3, similarly to the construction shown in FIG. 6.

Figure 4:
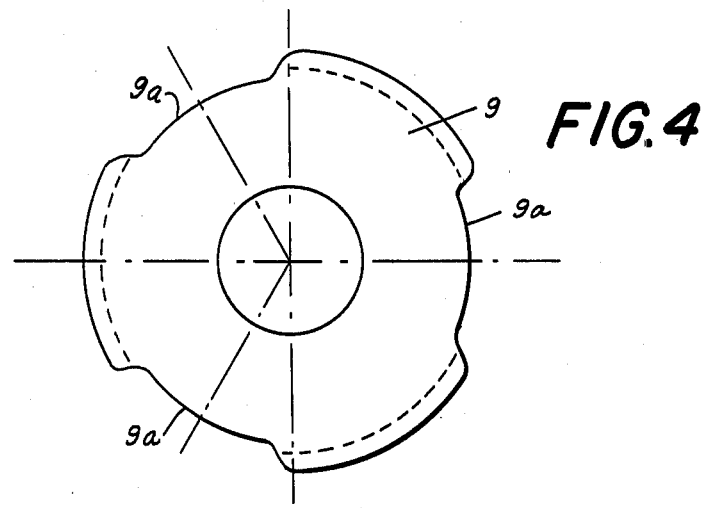
FIG. 4 is a plan view of a part identified by reference numeral 9 in FIG. 3.

As can be seen from FIGS. 1 and 3, the outer cup-shaped member in the region of its bottom 2a facing toward the open end of the housing 5, is provided with a coating 9 constituted by a wear-resistant material such as hard manganese. The friction shoes 10 of the friction device abut by their inner faces 10a against the coating 9. In the construction shown in FIG. 1 the coating 9 is formed as a disc, whereas in the construction shown in FIG. 2, the coating 9 is cup-shaped or hood-shaped and is fitted on the wall 2b of the outer cup-shaped member 2. The coating shown in FIG. 3 has slots 9a which extend in the direction of displacement of the arrangement. These slots are shown in FIG. 4 and identified by reference numeral 9a. The location and width of the slots 9a correspond to those of the inwardly extending projections 5c formed at the open end of the housing 5. Thereby, this coating 9 can be inserted into the housing 5 even when its outer diameter is larger than the diameter of the opening of the housing 5 in the regions of the projections 5c.

Figure 5:
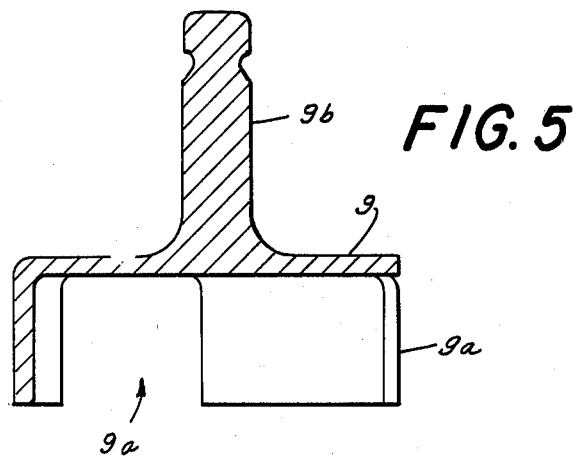
FIG. 5 is a view showing a longitudinal section of a part identified by reference numeral 9 in FIG. 3 in accordance with a further embodiment of the invention.

The outer cup-shaped member 2 is provided on its bottom 2a with a guiding pin 2d extending in a direction toward the open end of the housing 5. The guiding pin 2d engages in an opening 11a of the wedge-formed member 11 of the friction device for guiding purposes. The opening 11a has in its central region 11b a diameter which corresponds to the outer diameter of the guiding pin 2d. The opening further has two conical extensions 11c extending from the central region 11b to the ends of the opening 11a. When the opening 11a is so constructed, the above-mentioned guidance takes place without wedging even when the wedge-shaped member 11 is canted during operation. As can be seen particularly from FIG. 5, the guidance of the outer cup-shaped member 2 can be attained by provision of the guiding pin not on the bottom 2a of this cup-shaped member 2, but on the cup-shaped coating 9. Such a guiding pin is identified by reference numeral 9b.

Figure 2:
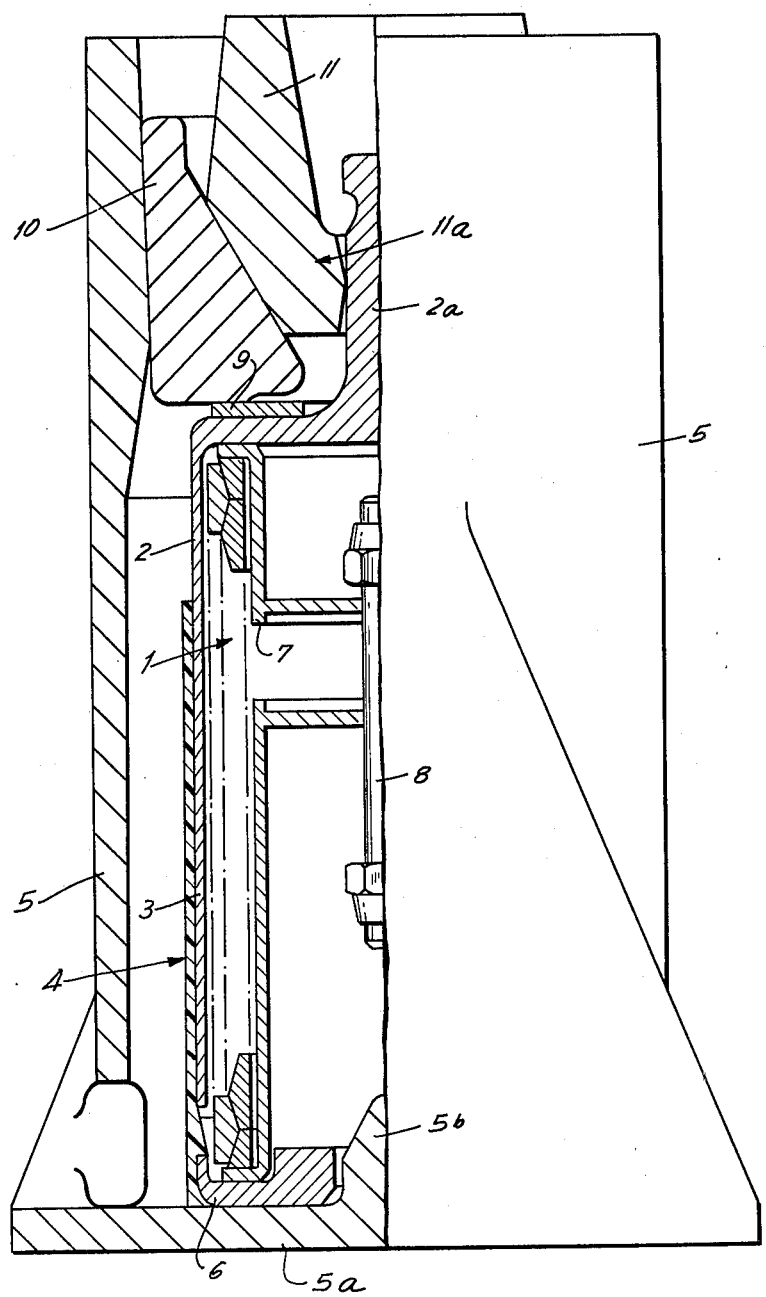
FIG. 2 is a view corresponding to that shown in FIG. 1, but showing the inventive arrangement in loaded condition with a compressed spring.

The inventive arrangement is shown in one half of FIG. 2 in loaded, e.g., compressed condition. As for the construction shown in this Figure, references will be made to the above presented description. It can be clearly seen from this Figure that the friction spring 1 with its outer rings 1a and inner rings 1b is protected against buckling since the upper cup-shaped member 2 and the inner cup-shaped member 3 considerably overlap one another in the longitudinal direction. The friction spring 1 is accurately held in the housing 5 by the guides which is formed by the pin 5b on the base plate 5a and the plate 6, on the one hand, and by the guide pin 2d and the opening 11a of the wedge-formed member 11, on the other hand.

It will be understood that each of the elements described above, or two or more together, may also find a useful application in other types of constructions differing from the types described above.

While the invention has been illustrated and described as embodied in a an arrangement for resiliently absorbing forces it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for resilient absorption of forces, particularly for an intermediate buffer coupling of rail vehicles, comprising an elongated housing having two spaced ends, a base plate and an axis, one of said ends being closed, whereas the other of said ends is open and has an opening; a friction element located in the region of said open end of the housing; a resilient element cooperating in series with said friction element and formed as a friction spring having two spaced ends and including a plurality of inner conical rings and a plurality of outer conical rings cooperating with one another with interposition of a lubricant; outer and inner cup-shaped casing members located in said housing and closably accommodating said friction spring, said outer cup-shaped member outwardly surrounding said outer conical rings of said friction spring and having a bottom located in the region of one end of the latter so as to form a support for said one end of said friction spring, said inner cup-shaped member being located inwardly of said inner rings of said friction spring and having a radially outwardly extending flange in the region of the other end of the latter so as to form a support for said other end of said friction spring, said flange of said inner cup-shaped member abutting against said base plate of said housing; and a sealing element which is fitted on said outer cup-shaped member and held on said inner cup-shaped member so that said cup-shaped members can move relative to one another in direction of elongation of said housing, but at the same time are sealed by said sealing element, said sealing element having a radially inwardly extending collar which is interposed between said flange of said inner cup-shaped member and said base plate of said housing so as to clamp said sealing element.

2. An arrangement for resilient absorption of forces, particularly for an intermediate buffer coupling of rail vehicles, comprising an elongated housing having two spaced ends, a base plate and an axis, one of said ends being closed, whereas the other of said ends is open and has an opening; a friction element located in the region of said open end of the housing; a resilient element cooperating in series with said friction element and formed as a friction spring having two spaced ends and including a plurality of inner conical rings and a plurality of outer conical rings cooperating with one another with interposition of a lubricant; outer and inner cup-shaped casing members located in said housing and closably accommodating said friction spring, said outer cup-shaped member outwardly surrounding said outer conical rings of said friction spring and having a bottom located in the region of one end of the latter so as to form a support for said one end of said friction spring, said inner cup-shaped member being located inwardly of said inner rings of said friction spring and having a radially outwardly extending flange in the region of the other end of the latter so as to form a support for said other end of said friction spring; a sealing element which is fitted on said outer cup-shaped member and held on said inner cup-shaped member so that said cup-shaped members can move relative to one another in direction of elongation of said housing, but at the same time are sealed by said sealing element; and a further plate arranged on said base plate and having a central collar and an outer surface cooperating with said sealing element, said flange of said inner cup-shaped member abutting against said further plate, and said inner cup-shaped member being guided on said central collar of said further plate.

3. An arrangement as defined in claim 2, wherein said further plate has an opening, said base plate of said housing having an axial projection which extends through said opening of said further plate so that the latter is guided on said projection.

4. An arrangement for resilient absorption of forces, particularly for an intermediate buffer coupling of rail vehicles, comprising an elongated housing having two spaced ends and an axis, one of said ends being closed, whereas the outer of said ends is open and has an opening; a friction element located in the region of said open end of the housing and having a wedge-shaped member provided with an opening; a resilient element cooperating in series with said friction element and formed as a friction spring having two spaced ends and including a plurality of inner conical rings and a plurality of outer conical rings cooperating with one another with interposition of a lubricant; outer and inner cup-shaped casing members located in said housing and closably accommodating said friction spring, said outer cup-shaped member outwardly surrounding said outer conical rings of said friction spring and having a bottom located in the region of one end of the latter so as to form a support for said one end of said friction spring, said inner cup-shaped member being located inwardly of said inner rings of said friction spring and in the region of the other end of the latter so as to form a support for said other end of said friction spring; a sealing element which is fitted on said outer cup-shaped member and held on said inner cup-shaped member so that said cup-shaped members can move relative to one another in direction of elongation of said housing, but at the same time are sealed by said sealing element; and means for centering said outer cup-shaped member and including a guiding pin associated with said bottom of said outer cup-shaped member and engaging in said opening of said wedge-formed member.

5. An arrangement as defined in claim 4, wherein said guiding pin is provided on said bottom of said outer cup-shaped member.

6. An arrangement as defined in claim 4, wherein said friction element including a friction shoe, said bottom of said outer cup-shaped member being provided with a wear-resistant coating abutting against said friction shoe, said guiding pin being provided on said coating.

7. An arrangement as defined in claim 4, wherein said opening of said wedge-formed member is elongated and has a central section and two ends as considered in a direction of elongation of said opening, said opening having a diameter which in said central section corresponds to that of said guiding pin of said centering means and increases in a direction toward said ends.

8. An arrangement as defined in claim 7, wherein said opening conically diverges from said central section to said ends.

9. An arrangement for resilient absorption of forces, particularly for an intermediate buffer coupling of rail vehicles, comprising an elongated housing having two spaced ends, a base plate and an axis, one of said ends being closed, whereas the other of said ends is open and has an opening; a friction element located in the region of said open end of the housing; a resilient element cooperating in series with said friction element and formed as a friction spring having two spaced ends and including a plurality of inner conical rings and a plurality of outer conical rings cooperating with one another with interposition of a lubricant; outer and inner cup-shaped casing members located in said housing and closably accommodating said friction spring, said outer cup-shaped member outwardly surrounding said outer conical rings of said friction spring and being located in the region of one end of the latter so as to form a support for said one end of said friction spring, said inner cup-shaped member being located inwardly of said inner rings of said friction spring; and a sealing element which is fitted on said outer cup-shaped member and held on said inner cup-shaped member so that said cup-shaped members can move relative to one another in direction of elongation of said housing, but at the same time are sealed by said sealing element, so that said resilient element with said cup-shaped members forms a positive connection resistant to transverse forces, with said base plate of said housing, on the one hand, and with said friction element, on the other hand.

10. An arrangement as defined in claim 9, wherein said outer cup-shaped member has a bottom which forms the support for said one end of said friction spring.

11. An arrangement as defined in claim 10, wherein said inner cup-shaped member has a radially outwardly extending flange which forms the support for said other end of said friction spring.

12. An arrangement as defined in claim 11, wherein said outer cup-shaped member has a wall which is axially spaced from said bottom thereof, said sealing element being fitted on said wall of said outer cup-shaped member and pressed on said flange of said inner cup-shaped member.

13. An arrangement as defined in claim 9, wherein said outer cup-shaped member has a wall, said sealing member being formed as a bellows connected with said wall of said outer cup-shaped member.

14. An arrangement as defined in claim 13; and further comprising means for connecting said bellows with said wall of said outer cup-shaped member and including a clamping band.

15. An arrangement as defined in claim 9, wherein said outer cup-shaped member has a wall, said sealing element is a tubular member which is constituted of an elastic material and is fitted on said wall of said outer cup-shaped member with a force which is directed radially inwardly toward said wall.

16. An arrangement as defined in claim 15, wherein said tubular member is constituted of a synthetic plastic material.

17. An arrangement as defined in claim 9, wherein said outer cup-shaped member has a bottom; and further comprising a cup-shaped pulling member located between said bottom of said outer cup-shaped member and said one end of said friction spring and connected with said inner cup-shaped member so that said friction spring is prestressed.

18. An arrangement as defined in claim 17; and further comprising means for connecting said pulling member with said inner cup-shaped member and including a centrally arranged pulling screw.

19. An arrangement as defined in claim 17, wherein said bottom of said outer cup-shaped member has a collar, said pulling member being fitted on said collar so as to be centered thereon.

20. An arrangement as defined in claim 9, wherein said outer cup-shaped member has a bottom which is provided with a wear-resistant coating facing toward said open end of said housing, said friction element including a friction shoe which has an axially inner face abutting against said coating.

21. An arrangement as defined in claim 20, wherein said coating is constituted by hard-manganese.

22. An arrangement as defined in claim 20, wherein said outer cup-shaped member has a circumferential surface, said coating being cup-shaped and fitted on said circumferential wall of said outer cup-shaped member in the region of said bottom thereof.

23. An arrangement as defined in claim 22, wherein said housing has a plurality of radially inwardly extending projections which reduce the cross section of said opening of said open end of said housing, said cup-shaped coating having a circumferential wall provided with a slot which extends in an axial direction and whose location and width correspond to those of said projections of said housing.

* * * * *